C. H. ELY.
TOOTH BRUSH.
APPLICATION FILED JULY 8, 1916.
1,232,517.                                    Patented July 10, 1917.
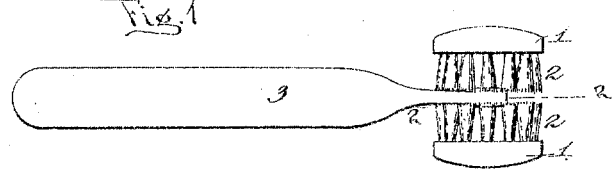
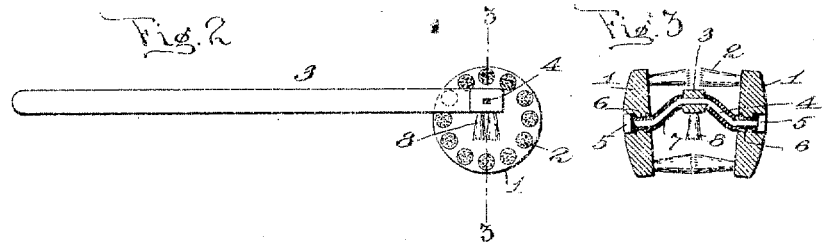
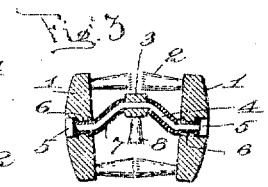
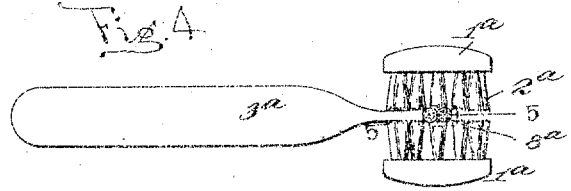
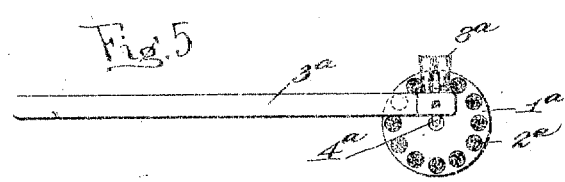
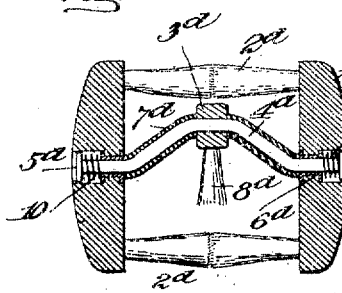
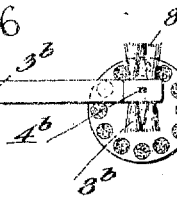
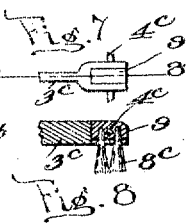
Witnesses:
W. Strong
J. F. Coleman
Inventor
Charles H. Ely
By Dyer Taylor
Attorneys

UNITED STATES PATENT OFFICE.

CHARLES H. ELY, OF EAST ORANGE, NEW JERSEY.

TOOTH-BRUSH.

1,232,517.   Specification of Letters Patent.   Patented July 10, 1917.

Application filed July 8, 1916. Serial No. 106,135.

*To all whom it may concern:*

Be it known that I, CHARLES H. ELY, a citizen of the United States, resident of East Orange, county of Essex, State of New Jersey, have invented a certain new and useful Improvement in Tooth-Brushes, of which the following is a specification.

This invention relates to improvements in tooth brushes, and has for its objects:

First: To provide means for simultaneously cleaning either upper or lower rows of the teeth, on both outer and inner faces, and also cleaning the cutting edges of the teeth as well.

Second: To increase the efficiency of the cleansing devices.

These and further objects will more fully appear from the following specification and accompanying drawing, considered together or separately.

In the drawings:—

Figure 1 is a plan view of a tooth brush, embodying the invention, and adapted to cleanse one row of teeth, and the cutting edges thereof.

Fig. 2 is a sectional view thereof, taken on the line 2—2 of Fig. 1.

Fig. 3 is a sectional view of the same, taken on the line 3—3 of Fig. 2.

Fig. 4 is a plan view of a tooth brush, embodying the invention, and showing a modification thereof, for cleaning one row of teeth and the cutting edges of the opposite row of teeth.

Fig. 5 is a sectional view, taken on the line 5—5 of Fig. 4.

Fig. 6 is a sectional view, of a modified form of brush, adapted to simultaneously cleanse the cutting edges of both rows of teeth.

Fig. 7 is a detail plan view.

Fig. 8 is a sectional view taken on the line 8—8 of Fig. 7, and

Fig. 9 is an enlarged sectional view, of a further modification.

In all views like parts are designated by the same reference characters.

In carrying out my invention, I provide two disks 1, 1, each having a suitable brushing device 2, 2. The disks may be made of any suitable material, for example, celluloid, hard rubber, bone, ivory, etc. As examples of a suitable brushing device, I may employ bristles, which may be tufted or otherwise arranged on one face of each disk. The disks are suitably supported upon a handle 3, in such a manner that the faces carrying the brushing devices will be in opposition. They are also mounted that each may be independently rotated. A suitable support may consist of the axle 4. This axle is made of any suitable material either stiff or elastic, but I prefer to employ one of spring metal, such as steel, so that a certain amount of elasticity may be secured. Preferably the ends of the axle are provided with enlarged heads 5, 5, so that the disks will be kept in place. To reduce wear I may employ bushing 6, 6, in each disk to act as bearings and allow the free rotation of the disks on the axle.

The axle is also preferably surrounded with a sleeve 7 of soft rubber. This sleeve, as shown, is in two parts, one on each side of the handle. The purpose of this sleeve is to prevent the teeth from coming in contact with the axle, and also hold the disks separated.

In connection with the parts hereinbefore described, I employ an auxiliary brushing device 8 on the handle, adjacent to the axle 4. This brushing device may be in the form of bristles, as shown. It is preferably located within the circle of bristles 2, 2, on the disks. Preferably the axle 4 is bent upward so that the bristles 8 are above the lowermost bristles 2, 2. This will enable the bristles to reach the entire inner and outer surfaces of the teeth without making the disks of large size as the teeth may reach well beyond the centers of the disks, and will place the auxiliary bristles in a more advantageous position to clean the cutting edges or upper surface of the lower teeth, or when reversed from the position illustrated in Fig. 3, will cleanse the cutting edges or lower surface of the upper teeth. Preferably also the axle is so bent that the two disks are inclined or dished, as shown in Fig. 3. This will engage the bristles 2, 2, at the bottom, but separate them at the top, leaving a space for passage of the handle 3.

In operation, the device is moved along the entire row of teeth, cleaning the sides thereof by means of the bristles 2, 2, and also simultaneously cleaning the cutting edges of the teeth by means of the bristles 8.

Figs. 4 and 5 show a modification of the invention in which the bristles $8^a$ extend upward beyond the perimeter of the bristles $2^a$, $2^a$. With this device the sides of one row of teeth will be cleaned while the cutting edges of the other row will be acted on.

Fig. 6 illustrates a modification employing two sets of auxiliary bristles $8^b$, $8^b$, on opposite sides of the handle $3^b$. By this device opposite cutting edges of the teeth may be simultaneously cleaned.

Figs. 7 and 8 illustrate a detail of construction whereby the bristles $8^c$ are embedded in an inset plate 9. This plate may be held in place by any suitable means, but preferably by the engagement of the axle $4^c$ which passes through it. The inset plate is preferably of less depth than the handle, as shown, whereby an increased length of bristle is secured with correspondingly greater flexibility.

Fig. 9 illustrates a modification, in which springs 10. 10. are arranged between the heads $5^d$ and bushings $6^d$. These springs serve to hold the disks in position, but allow a certain amount of separation when the brush is in use.

The disks 1, $1^a$, $1^b$, $1^c$ and $1^d$ are provided with countersinks for the reception of the headed ends of the shaft.

The operation of my improved brush is as follows:

The brush is placed within the mouth with a disk on each side of the row of teeth to be cleaned. On account of the arch in the axle the bristles on the lower sides of the disks will reach to the gums so that the entire exposed surfaces of the teeth will be reached. The bristles on one disk will engage the front of the teeth, those on the opposite disk will engage the rear and the bristles on the handle will engage the top or crown of the teeth. The disks are so spaced that the bristles will nearly meet and will therefore reach well into the spaces between the teeth. The brush is now moved back and forth in the horizontal direction and the engagement of the bristles on the disks with the teeth will cause the disks to rotate and this rotary movement will cause the bristles on that side of the disks which are moving toward the tops of the teeth not only to dislodge any substance which may be between the teeth but to actually carry it out of the space. The front and back of the teeth will be brushed with the proper rotary movement and the crowns or top will be simultaneously brushed.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

1. A tooth brush having a handle, a bent axle carried thereby adjacent to one end thereof, a fixed brushing device carried by the handle adjacent to the axle, and a disk mounted on the axle on each side of the handle, each disk having brushing devices on opposing faces.

2. A tooth brush having a handle, an axle carried by the handle, a disk carried on each end of the axle and arranged one on each side of the handle, a series of bristles carried by the handle, and series of bristles carried by the disks on opposed faces thereof.

3. A tooth brush having a handle, bristles carried by the handle, an axle carried by one end of the handle and extending transversely thereto and to both sides thereof, a disk rotatably mounted on each end of the axle, and a series of bristles carried by each disk, said bristles extending toward the handle.

4. A tooth brush having a handle, a series of bristles carried by the handle, an axle carried by one end of the handle and extending transversely thereto and to both sides thereof, a disk rotatably mounted on each end of the axle, and a series of bristles carried by each disk, said bristles extending toward the handle and surrounding the first mentioned series of bristles.

5. A tooth brush having a handle, an axle carried by the handle, said axle having a bent portion, a disk mounted on each side of the bent portion, each disk being capable of independent rotation, a series of bristles carried on opposed faces of the disks, and a series of bristles supported intermediate the disks.

6. A tooth brush, having a handle, a shaft carried thereby, two disks carried by said shaft one on each side of the handle, bristles carried by said disks on opposing faces thereof, and yielding means for holding said disks in position to engage the bristles with the sides of the teeth.

7. A tooth brush having a handle, a shaft carried thereby, two disks carried by said shaft and arranged one on each side of the handle, an inset plate carried by said handle, bristles carried by said inset plate, said plate being of less thickness than the handle, and bristles carried by said disks on opposing faces thereof.

This specification signed and witnessed this 6th day of July, 1916.

CHARLES H. ELY.

Witnesses:
J. F. COLEMAN,
ANNA E. RENTON.